(12) United States Patent
Arai et al.

(10) Patent No.: US 9,270,130 B2
(45) Date of Patent: Feb. 23, 2016

(54) METHOD AND SYSTEM TO MOUNT A PORTABLE ELECTRONIC DEVICE TO WIRELESSLY CHARGE

(71) Applicant: Honda Motor Co., Ltd., Tokyo (JP)

(72) Inventors: Hideaki Arai, Powell, OH (US); Aaron Ambrose, Shawnee Hill, OH (US); Andrew R. Hoover, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 14/068,022

(22) Filed: Oct. 31, 2013

(65) Prior Publication Data

US 2015/0115877 A1 Apr. 30, 2015

(51) Int. Cl.
*H02J 7/00* (2006.01)
*H02J 7/02* (2006.01)

(52) U.S. Cl.
CPC .............. *H02J 7/0042* (2013.01); *H02J 7/025* (2013.01)

(58) Field of Classification Search
CPC ................................. H02J 7/025; H02J 7/0042
See application file for complete search history.

(56) References Cited

U.S. PATENT DOCUMENTS

| | | | |
|---|---|---|---|
| 6,466,837 B1* | 10/2002 | Mimura et al. | 700/121 |
| 7,479,091 B2* | 1/2009 | Yang | 477/108 |
| 7,740,623 B2* | 6/2010 | Nayak et al. | 604/500 |
| 7,863,859 B2* | 1/2011 | Soar | 320/108 |
| 7,948,208 B2* | 5/2011 | Partovi et al. | 320/108 |
| 8,743,856 B2* | 6/2014 | Lee et al. | 370/342 |
| 2009/0072782 A1* | 3/2009 | Randall | 320/107 |
| 2009/0121592 A1* | 5/2009 | De Nando et al. | 312/209 |
| 2011/0241435 A1* | 10/2011 | Saito | 307/104 |
| 2011/0291614 A1 | 12/2011 | Yeh | |
| 2012/0019202 A1 | 1/2012 | Beart et al. | |
| 2012/0019208 A1* | 1/2012 | Clouser | 320/115 |
| 2012/0161721 A1* | 6/2012 | Neethimanickam | 320/167 |
| 2012/0235474 A1 | 9/2012 | Mannino et al. | |
| 2013/0078855 A1 | 3/2013 | Hornick et al. | |
| 2013/0093388 A1 | 4/2013 | Partovi | |
| 2013/0106346 A1 | 5/2013 | Salter et al. | |
| 2013/0141037 A1* | 6/2013 | Jenwatanavet et al. | 320/108 |
| 2014/0028243 A1* | 1/2014 | Rayner | 320/103 |
| 2014/0203663 A1* | 7/2014 | Waffenschmidt et al. | 307/109 |
| 2015/0042268 A1* | 2/2015 | Chen et al. | 320/108 |

OTHER PUBLICATIONS

Article: "I hate the Nexus 4 Wireless Charger"—Android Central published Apr. 11, 2013.

* cited by examiner

Primary Examiner — Naum B Levin
(74) Attorney, Agent, or Firm — Rankin, Hill & Clark LLP (57) ABSTRACT

A system and method for mounting and charging a portable electronic device on or in contiguity to a wireless charging device. The wireless power transferring and charging device includes a suction pump that provides a suction vacuum to mount/hold a portable electronic device onto an induction charging surface of the wireless charging device in a vertical or semi-vertical position to be wirelessly powered and/or charged.

20 Claims, 4 Drawing Sheets

METHOD AND SYSTEM TO MOUNT A PORTABLE ELECTRONIC DEVICE TO WIRELESSLY CHARGE

BACKGROUND

The charging of portable electronic devices such as cell phones, smart phones, tablets, MP3 players, etc. within vehicles has evolved. Many vehicles utilized typical wired charging apparatuses that require a user to position the portable electronic device in a specific manner that would allow a DC power cord to be plugged in to a DC connector such as a vehicle power supply, power adapter, or cigarette lighting receptacle. With the advent of inductive charging, vehicles started to utilize in-vehicle inductive chargers. An inductive charger typically uses an induction coil to create an electromagnetic field to transfer power to a portable electronic device which also contains an induction coil to receive power from the electromagnetic field and coverts it into an electrical current in order to charge the battery of the portable electronic device.

Wireless/inductive chargers have been located within the center panel of a front portion of the vehicle compartment, between the driver and passenger seats of a vehicle. These charging arrangements require that inductive wireless charging can only occur when the portable electronic device is placed in a horizontal position while charging. However, horizontal charging is associated to many types of issues and places limitations as to the user's use of the device. These issues and limitations are caused by a difficult angle of operating the device, difficult viewing of the device screen, and high likelihood of an object or other individual obstructing access to the device. In addition, horizontal charging requires vehicles to be equipped with a tray or specific area within the center panel of the vehicle to hold and charge the portable electronic device in a stationary position in order to maintain a wireless charge. Additionally, horizontal positioning also increases the likelihood of wasted charging energy as foreign objects such as coins tend to collect in a vehicle's horizontal surface.

To counter these issues, manufactures have employed the use of suction cups, suckers, or hook and loop fasteners to hold a portable device in place in a vertical charging position. However, such components tend to have a very short lifecycle as they do not maintain a hold on the devices for an extended period of time, rendering the charger useless after a short amount of time. In many cases, such components can not retain or mount a device for an extended period of use causing the portable electronic device to be released and dropped due to a lack of prolonged suctioning or fastening strength.

Also many of these devices require that the user append hook and loop fasteners, a cover, or an adhesive material onto the surface of the portable electronic device in order to retain the portable electronic device to the charger. Additionally, many of these inductive charges include claps, cradles, or holders only configured for a limited amount of electronic device form factors. In many instances, the limitations of these devices cause driver's to be distracted as portable electronic devices fail to retain a charge or fall to the ground, which can result in damage to the portable electronic device in some cases.

SUMMARY

According to one aspect, a method for mounting and charging a portable electronic device comprising receiving a command to begin operating a wireless charging device is provided. The method includes operating a suction pump in response to receiving the command to begin operating such that air is drawn through a suctioning unit positioned on or adjacent to an induction charging surface of the wireless charging device to draw a portable electronic device toward the induction charging surface. The method further includes providing power to an induction coil on or adjacent to the induction charging surface to transfer energy from the wireless charging device to the portable electronic device while the portable electronic device is on or in contiguity to the induction charging surface.

According to another aspect, an electronic device mounting and charging system for wirelessly charging a portable electronic device in a vertical, semi-vertical, or horizontal position comprising a wireless charging device casing. The system also includes an induction charging surface on or in the casing. The system also includes a plurality of suctioning units on or adjacent to the induction charging surface. The system further includes an induction coil on or adjacent to the induction charging surface. The system also includes a plurality of suctioning units on or adjacent to the induction charging surface. The system further includes a suction pump that is in fluid communication with the plurality of suctioning units and a control unit in communication with the induction coil and suction pump.

According to another aspect, a method for simultaneously mounting and wirelessly charging a portable electronic device in a vertical, semi-vertical, or horizontal position comprising providing a wireless charging device including an induction charging surface that is associated with an induction coil. The method includes creating a suctioning vacuum by drawing air through air intake holes of a plurality of suctioning units through a vacuum air duct into a suction pump to create a suction vacuum between the plurality of suctioning units and the surface of the portable electronic device. The method further includes providing a wireless electrical charge from the induction coil to transfer the wireless electric charge through an electromagnetic field from the induction coil to a receiver coil within the portable electronic device.

DETAILED DESCRIPTION

Figure 1:
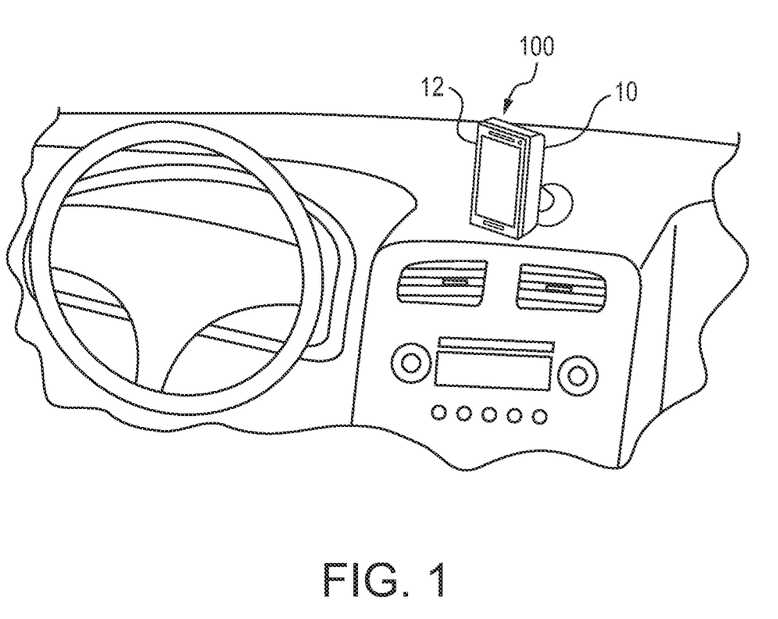
FIG. 1 is an illustrative view of the electronic device mounting and charging system being utilized in a vehicle, according to an exemplary embodiment of the disclosure.
Figure 2:
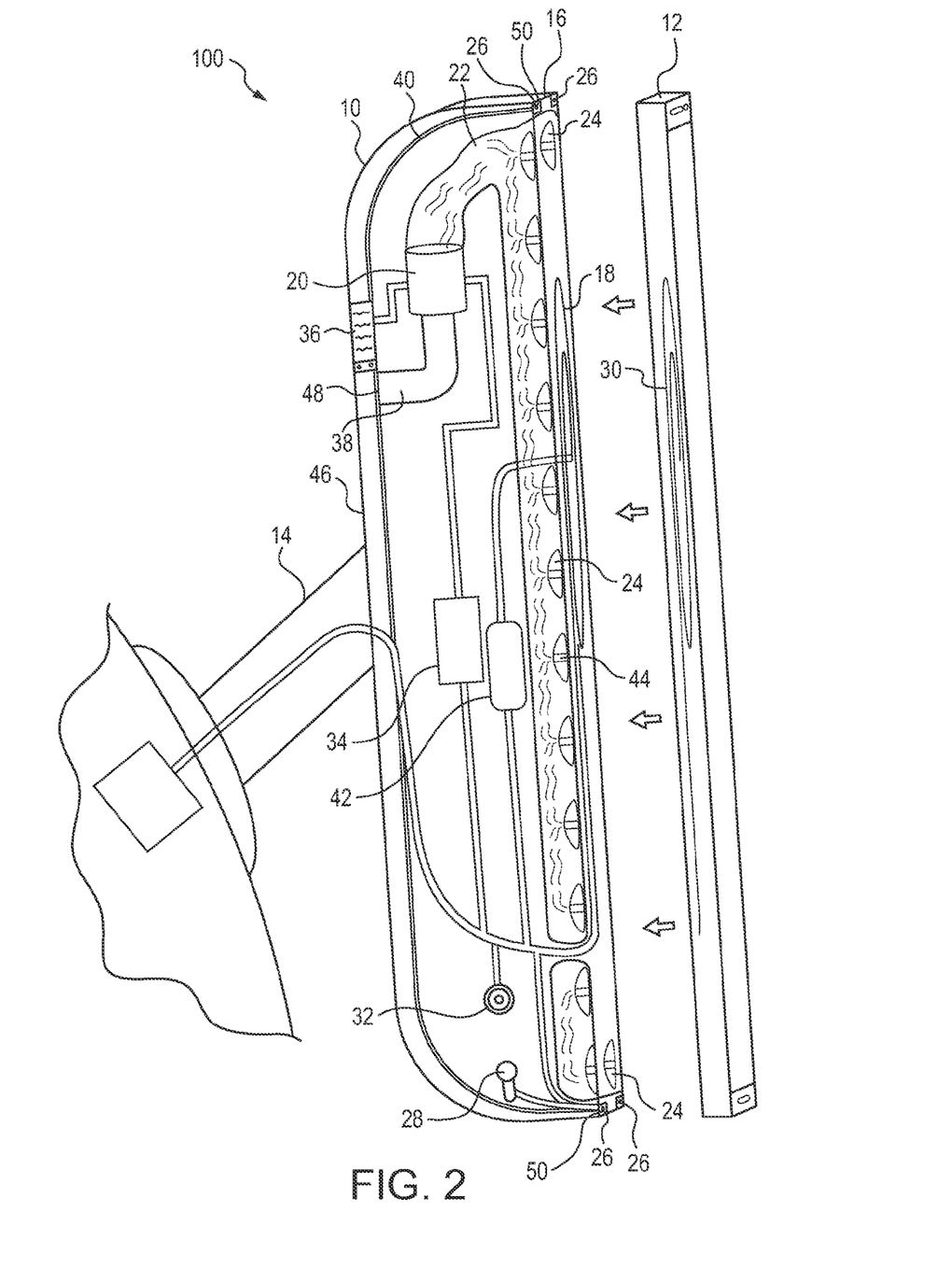
FIG. 2 is a schematic cross-sectional view of an embodiment of a wireless charging device of the electronic device mounting and charging system shown in FIG. 1 and a portable electronic device to be charged by the system.

Referring now to the drawings, wherein the showings are for purposes of illustrating one or more exemplary embodiments and not for purposes of limiting the same, FIG. 1 illustrates a view of an electronic device mounting and charging system 100 being utilized in a vehicle (only a portion of which is shown) to mount a portable electronic device 12 in a vertical position according to an exemplary embodiment. FIG. 2 illustrates an enlarged schematic cross-sectional view of an exemplary embodiment of the electronic device mounting and charging system 100. As will be appreciated by those skilled in the art, the electronic device mounting and charging system 100 may be used to mount and wirelessly charge one or more types of portable electronic devices 12 that are attached to a wireless charging device 10.

The portable electronic device 12 may be, for example, a cellular phone, a smart phone, a hand-held reader, a tablet device, and/or a MP3 player. In addition, the portable electronic device 12 may be manufactured by various manufacturers and may be configured in a plurality of form factors, designs, and/or configurations. In the embodiment discussed herein, the portable electronic device 12 is one that is capable of being wirelessly charged by the use of induction technology. The portable electronic device(s) 12 discussed in the exemplary embodiments herein include a receiving induction coil 30 for receiving electromagnetic signals that are transferred to the portable electronic device 12 from an induction coil 18 within the wireless charging device 10. The receiving induction coil 30 is capable of transferring the electronic signals into power which is then fed into the battery (not shown) of the portable electronic device 12 to be charged or fed to the device itself, or to be utilized as running power.

The exemplary embodiment of electronic device mounting and charging system 100 shown in FIGS. 1 and 2, further includes an attachment member 14, an induction charging surface 16, a suction pump 20, a vacuum air duct 22, a plurality of suctioning units 24, a plurality of proximity sensors 26, and an ON/OFF switch/button 28. A control unit 34 is provided in the wireless charging device 10 and is in communication with the induction coil 18, the suction pump 20, the proximity sensors 26, and the ON/OFF switch/button 28. As shown in FIG. 1, the wireless charging device 10 described in the present embodiment can be mounted onto a vehicle's dash board to be utilized by the user within the vehicle. The wireless charging device 10 can also be located on or mounted to other vehicle parts and accessories such as a windshield, seat, console, door, and/or ceiling of the vehicle.

It is to be appreciated, that the electronic device mounting and charging system 100 may also include a number of additional components and that the wireless charging device 10 may charge additional types of undisclosed portable devices or portable devices that are not presently produced. In addition, the electronic device mounting and charging system 100 may comprise of different types of chargers and charging means to charge the portable electronic device 12. For example, the electronic device mounting and charging system 100 can include a standard power charging device, wired USB charging device, or the wireless charging device 10. In some embodiments, the electronic device mounting and charging system 100 may include a means to connect to a computer to provide communications between the portable electronic device 12 and the computer though a USB connection, FireWire connection, Bluetooth connection, or other wireless means. In alternate embodiments, the electronic device mounting and charging system 100 may also include a microphone and speaker to incorporate Bluetooth technology and also utilize the wireless charging device 10 as a hands free Bluetooth speaker phone device that can be paired with certain types of portable electronic devices 12. For example, a user may pair his or her smart phone, which is in proximity or mounted to the wireless charging device 10 to be utilized as a hands free Bluetooth speaker phone.

In other embodiments, the electronic device mounting and charging system 100 may include means to connect to a wired or wireless internet connection and provide a wireless hotspot connection for the portable electronic device 12 to connect to and access the internet. However, the exemplary embodiments discussed herein relate to the architecture and operation of the electronic device mounting and charging system 100 as a wireless charging system which utilizes the wireless charging device 10 equipped with induction technology to wirelessly charge the portable electronic device 12.

In the embodiment shown in FIG. 2, the wireless charging device 10 includes a casing 40. An attachment member 14 that can be attached to many types of external surfaces as described above extends from a rear portion 38 of the casing 40. The attachment member 14 can include various types of embodiments and configurations that allow the wireless charging device 10 to position the portable electronic device 12 in a vertical or semi vertical charging position. There are also various means to secure the attaching member 14 to the external surfaces of a desired location such as suction cups, adhesive materials, or brackets. For example, the attachment member 14 can be installed onto a vehicle head unit in the vehicle by utilizing an adhesive material that holds the attachment member 14 and consequently the wireless charging device 10 in place. On the opposite side of the casing 40 from the attachment member 14 is the induction charging surface 16. The casing 40 connects the induction charging surface 16 to the rear portion 38 of the wireless charging device 10.

In the illustrated embodiment, the wireless charging device 10 includes the plurality of suctioning units 24 disposed around the induction coil 18. The induction coil 18 is positioned within the induction charging surface 16 in the casing 40. The induction coil 18 may be comprised of a single wire that is coiled inwards in one direction and outwards in another direction. In one embodiment, the induction coil 18 is configured to receive power from a power source, e.g. a vehicle battery, that is connected to a power adapter attached to the wireless charging device 10.

In an alternate embodiment, the induction coil 18 is configured to receive power from a battery pack 42 that is attached to the wireless charging device 10. The battery pack 42 can be charged when the wireless charging device 10 is connected to an external power source and utilized when the wireless charging device 10 is no longer connected to an external power source. The battery pack 42 is shown inside the casing 40 in FIG. 2, but can be located outside the casing 40.

Figure 3:
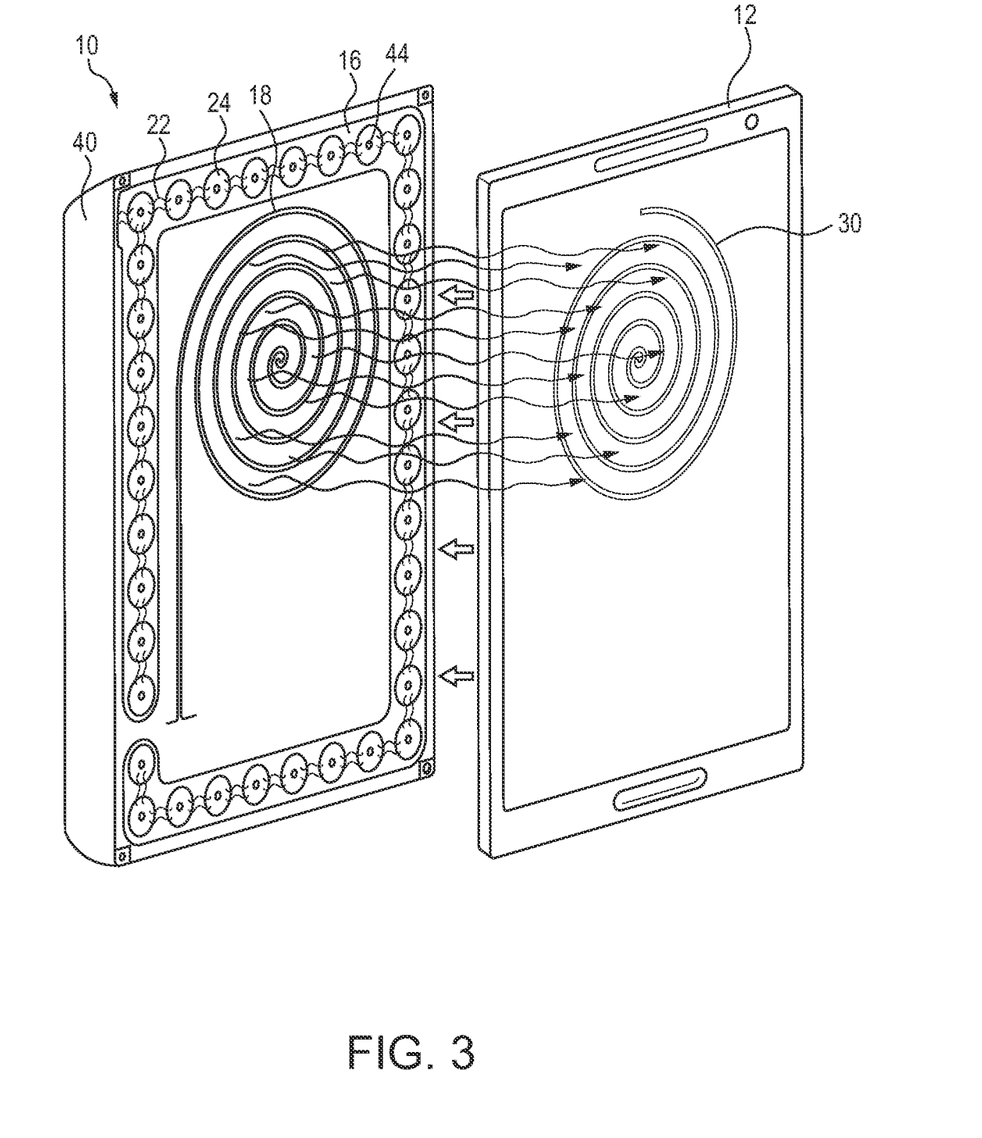
FIG. 3 is a schematic perspective view of the wireless charging device and the portable electronic device.

As shown in FIG. 3, the induction coil 18 is configured to emit an electrical current (schematically depicted by wavy arrows in FIG. 3) in the form of an electromagnetic field that can be received by the receiving induction coil 30 integrated into the portable electronic device 12 that is on or in contiguity to the wireless charging device 10. The electromagnetic field is received by the receiving induction coil 30 to either charge the battery of the portable electronic device 12 or operate the portable electronic device 12.

The vacuum air duct 22 is also located within the casing 40 and can be situated around the induction coil 18. The vacuum air duct 22 extends to the front facing portion of the induction charging surface 16 where the plurality of suctioning units 24 are disposed. The plurality of suctioning units 24 may include suction cups, adhesive/gripping material, suckers, or the like to hold onto the portable electronic device 12. The plurality of suctioning units 24 also include air intake holes 44 that are in fluid communication with the vacuuming air duct 22 which is fluidly connected to the suction pump 20. At the same time that the induction coil 18 is operating to emit an electromagnetic field, the suction pump 20 is configured to provide a suction vacuum through the vacuum air duct 22 and to the plurality of suctioning units 24 to attract the portable electronic device 12 towards the induction charging surface 16.

The induction charging surface 16 may be configured in various shapes, sizes, and dimensions to accommodate various types of portable electronic devices 12. In some embodiments, the induction charging surface 16 may be detachable from the wireless charging device 10 allowing a user to attach a different sized induction charging surface 16 to the wireless charging device 10. In alternate embodiments, the induction coil 18 and the plurality of suctioning units 24 are disposed within, on or adjacent to the induction charging surface 16 in a variety of configurations, sizes, and locations that are designed to hold a variety of portable electronic devices 12. For example, such variations in configuration can account for the charging of the user's smart phone in one instance and a user's tablet device in another instance.

Upon being enabled, the suction pump 20 of the electronic device mounting and charging system 100 is utilized to provide a suction vacuum to mount the portable electronic device 12 in a charging position against the induction charging surface 16 of the wireless charging device 10. The suction pump 20 includes a motor (not shown) that runs when the wireless charging device 10 is initialized. In the exemplary embodiment shown in FIG. 2, the suction pump 20 is located in the casing 40 adjacent to the rear portion 38 and is operably connected to the vacuum air duct 22.

In one exemplary embodiment, during operation of the suction pump 20, air is drawn through the air intake holes 44 in each suctioning unit 24 and toward the suction pump 20. The air is further drawn through the suctioning unit 20 into a discharge duct 46 and an air outlet 48 in the rear portion 38. The drawing of air through the plurality of suctioning units 24 forms a suctioning/vacuuming force to attract the rear surface of the portable electronic device 12 towards the inductive charging surface 16.

In alternate embodiments, the suction pump 20 may not be attached to the casing 40 or be located within the wireless charging device 10 and may be located in a different location. For example, a suction pump 20 can be located within the engine compartment of the vehicle, HVAC unit, or other location and can be operably connected to the wireless charging device 10 through the use of a vacuum air duct 22 that is configured to extend out from the casing 40 of the wireless charging device 10.

In some embodiments, the electronic device mounting and charging system 100 can include a power ON/OFF switch/button 28 for a user to enable or disable the wireless charging device 10 at his or her will. In other embodiments, the wireless charging device 10 can automatically be initialized once it is receiving power from an external power source. Once the wireless charging device 10 is initialized, the suction pump 20 begins operation, allowing the user to place his or her portable electronic device 12 in place onto the wireless charging device 10 to be mounted and wirelessly charged.

In one embodiment, the electronic device mounting and charging system 100 includes a plurality of proximity sensors 26 that also emit an electromagnetic field to identify an interfering portable electronic device 12 as a proximity target. The plurality of proximity sensors 26 are configured to activate the wireless charging device 10 once the portable electronic device 12 is sensed to be in close proximity to the induction charging surface 16. Once a user places the portable electronic device 12 in close sensing proximity to the plurality of proximity sensors 26, the suction pump 20 is also initialized to attract the rear surface of the portable electronic device 12 towards the plurality of suctioning units 24 on the front portion of the induction charging surface 16. In some embodiments, one or more of the plurality of proximity sensors 26 includes a photoelectric sensor 50 which can detect if the portable electronic device 12 is starting to slip/slide off the induction charging surface 16. If the photoelectric sensor(s) 50 senses that the portable electronic device 12 is starting to slip/slide off of the induction charging surface 16, the control unit 34 instructs the suction pump 20 to increase the suctioning force in order to mount the portable electronic device 12 properly.

In some embodiments, the electronic device mounting and charging system 100 can include a LED or touch screen display 36 that include separate or user interface selection buttons that is shown on the rear portion 38, but can be located on a side portion of the wireless charging device 10. The LED display or touchscreen display 36 is operably connected to the control unit 34. The user may utilize the LED or touchscreen display 36 and selection buttons to select a category of his or her portable electronic device 12. Based on the user's selection, the control unit 34 ensures that the suction pump 20 applies the appropriate amount of power and suctioning/vacuuming force to mount/hold the portable electronic device 12. For example, the user may be presented with categories to select such as "Small Smartphone", "Large Smartphone", "Small Tablet", "Large Tablet", etc. The user can select one of the categories, and the control unit 34 will thereby instruct the suction pump 20 to apply an amount of power and suctioning/vacuuming force that corresponds to the category selected.

In some embodiments, the electronic device mounting and charging system 100 can include one or more visual qualities, such as a charging light 32, that are placed on the wireless charging device 10 to inform a user that his or her portable electronic device 12 is being charged or is fully charged by the wireless charging device 10. In some embodiments, Bluetooth technology may be utilized to communicate with the portable electronic device 12 and display a battery charging status and percentage of charge of the portable electronic device 12 in real time on the LED/touchscreen display 36.

Figure 4:
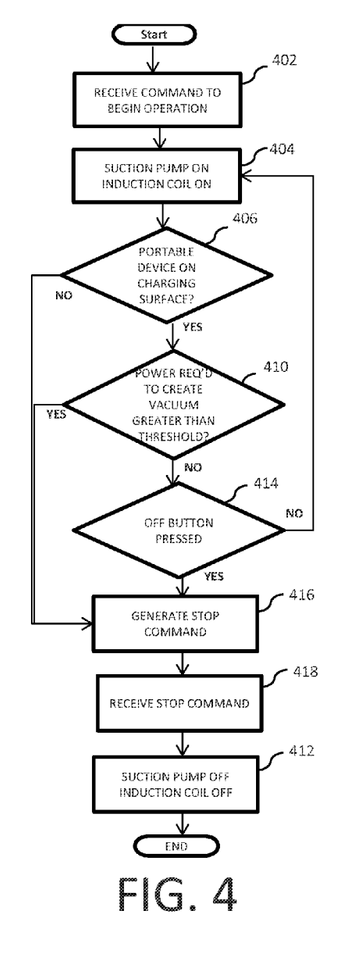
FIG. 4 is a process flow diagram of an exemplary method for operating the electronic device mounting and charging system, according to an exemplary embodiment of the disclosure.

Referring now to FIG. 4, an exemplary method that may be utilized by several embodiments discussed herein to operate the electronic device mounting and charging system 100 is shown. In particular, the method will be described in association with the embodiment of the electronic device mounting and charging system 100 illustrated in FIG. 2, though it is to be appreciated that the method could be used with other embodiments of the electronic device mounting and charging system 100.

At step 402, the control unit 34 receives a command to begin operation of the wireless charging device 10. In one embodiment, the wireless charging device 10 is enabled by pushing the ON/OFF switch/button 28 attached to the wireless charging device 10 in an ON position. In another embodiment, the plurality of proximity sensors 26 can be positioned on or around the induction charging surface 16 or attached onto the attachment member 14 to sense when a user places a portable electronic device 12 in proximity to the wireless charging device 10. The plurality of proximity sensors 26 sense the portable electronic device 12 by emitting an electromagnetic field to identify the portable electronic device 12 as a proximity target. When the user moves the portable electronic device 12 closer to the induction charging surface 16, the plurality of proximity sensors 26 sense the portable electronic device 12 and send a signal to the control unit 34 to enable, e.g. turn ON, the induction coil 18 and the suction pump 20 at step 404.

In yet another embodiment, the induction coil 18 and suction pump 20 may be enabled at any point when power is being received from a power source through the power adapter. For example, wireless charging device 10 and suction pump 20 may be hardwired to a vehicle DC power and will be enabled, e.g. the control unit 34 will receive a command to begin operation of the wireless charging device 10, when an accessory (ACC) power of the vehicle is turned on.

In some embodiments, the electronic device mounting and charging system 100 ensures that the portable electronic device 12 receives a proper charge and is receiving the proper amount of suctioning/vacuuming power to ensure that the portable electronic device 12 does not receive a poor charge or slide off of the wireless charging device 10. If it is determined that the plurality of proximity sensors 26 detects a presence of an object other than the portable electronic device 12 on the induction charging surface 16, a stop command is generated (step 416). For example, if the wireless charging device 10 is aligned in a horizontal position and one or more foreign object(s) such as paper, a coin(s), a cord(s), etc., is detected by the plurality of proximity sensors 26, the suction pump 20 will cease to provide a suction vacuum and the induction coil 18 will cease to emit wireless power. In some embodiments, if a foreign object is detected which is deterring the proper mounting and charging of the portable electronic device 12, the charging light 32 will intermittently flash. In some embodiments, if a foreign object is detected on the induction charging surface 16, a corresponding message will appear on the LED/touchscreen display 36 to inform the user of the obstructing object.

At step 406, the control unit 34 of the electronic device mounting and charging system 100 determines if the user places his or her portable electronic device 12 on the induction charging surface 16 (without any obstructing object). This determination can be made through the use of the plurality of proximity sensors 26. If it is determined that the user has placed his or her portable electronic device 12 on the induction charging surface 16, the suction pump 20 can continue to operate to create a suction vacuum between the plurality of suctioning units 24 on the induction charging surface 16 and the portable electronic device 12. The suction pump 20 can operate continually to apply suction to mount/hold the portable electronic device 12 against the plurality of suctioning units 24. While the portable electronic device 12 is being held against the induction charging surface 16 by the suction pump 20 operating, the induction coil 18 emits wireless power from within the induction charging surface 16 to the receiving induction coil 30 within the portable electronic device 12.

At step 410, the electronic device mounting and charging system 100 utilizes various means to determine if an amount of power to maintain suction to hold the portable electronic device 12 is greater than a predetermined threshold. The threshold is set by evaluating the amount of power required to maintain the suctioning/vacuuming force to hold the portable electronic device 12 in place against the contravening force of gravity, but at the same time release the portable electronic device 12 upon the contravening force of the user as he or she removes the portable electronic device 12 from the wireless charging device 10.

In one embodiment, the control unit 34 utilizes the photoelectric sensor(s) 50 within one or more of the plurality of proximity sensors 26 to maintain the suctioning/vacuuming force to hold the portable electronic device 12 in place against the contravening force of gravity. The photoelectric sensor(s) 50 detects if the portable electronic device 12 is starting to slip/slide off the induction charging surface 16. Based on the data provided by the photoelectric sensor(s) 50, the control unit 34 determines the amount of power and suctioning/vacuuming force required by the suction pump 20 to mount/hold the portable electronic device 12 in a stationary position. For example, the photoelectric sensor(s) 50 can detect movement of the portable electronic device 12 with respect to the induction charging surface 16. Upon the detection of movement, the control unit 34 instructs the suction pump 20 to increase suctioning/vacuuming force until the photoelectric sensor(s) 50 detect that the portable electronic device 12 is stationary. The control unit 34 then continues to apply the respective amount of power and suctioning/vacuuming force to hold/mount the corresponding portable electronic device 12 from that point forward.

In an alternate embodiment, the electronic device mounting and charging system 100 utilizes the user's preset portable electronic device 12 category that was inputted using the LED/touchscreen display 36 as described above. The control unit 34 utilizes the portable electronic device 12 category to establish the appropriate amount of power and suctioning/vacuuming force that is required to mount/hold the portable electronic device 12 in a vertical, semi-vertical, or horizontal position. For example, if the user uses the touchscreen display 36 to select a "Large Smartphone", the control unit 34 commands the suction pump 20 to provide the proper amount of power and suctioning/vacuuming force to mount the portable electronic device 12 that would fall into the predetermined weight classification of "Large Smartphone."

In yet another embodiment, the electronic device mounting and charging system 100 may utilize Bluetooth technology to communicate with the portable electronic device 12 and retrieve the make/model of the portable electronic device 12. The control unit 34 then categorizes the portable electronic device 12 into a corresponding weight category based on preset make/model data that resides within the control unit 34 memory. Based on the categorization, the control unit 34 establishes the appropriate amount of power and suctioning/vacuuming force required to mount/hold the portable electronic device 12 in a vertical, semi-vertical, or horizontal position. The control unit 34 memory may be further updated with device models and associated weight categories through a mobile application that may reside on the user's portable electronic device 12 using a Bluetooth connection. For example, a mobile application may be used to input make(s), model(s) and associated weight data that is updated to the control unit 34 memory using a Bluetooth connection to/from the portable electronic device 12.

If the electronic device mounting and charging system 100 does not determine that power required surpasses or is greater than the predetermined threshold, then the wireless charging device 10 and suction pump 20 continue to operate and provide the amount of suction required to mount/hold the portable electronic device 12 for continued powering/charging. However, if the user acts to remove the portable electronic device 12 from the wireless charging device 10, then the electronic device mounting and charging system 100 will sense that the predetermined threshold has been surpassed.

The electronic device mounting and charging system 100 disables the wireless charging device 10 and suction pump 20 at step 412. For example, the suction pump 20 will operate until the user acts to remove the portable electronic device 12 from the induction charging surface 16, at which time the suction pump 20 will cease to provide a suction vacuum and the portable electronic device 12 will be releasable and accessible to the user. In some embodiments, the plurality of proximity sensors 26 will detect that the portable electronic device 12 is no longer in proximity of the wireless charging device 10 and will disable the wireless charging device 10 along with the suction pump 20 (see step 406). At step 414, the operator can press the ON/OFF switch/button 28 to turn the suction pump 20 and the induction coil 18 OFF. The control unit 34 can continuously monitor whether the portable electronic device 12 is on or against the induction charging surface 16 (step 406), whether the power required to create the vacuum is greater than the predetermined threshold (step 410) and whether the ON/OFF switch/button 28 has been pressed (step 414) and in any order. A stop command can then be generated (step 416) and received (step 418) before the suction pump 20 and the induction coil 18 are turned OFF (step 412).

Furthermore, in some embodiments, the electronic device mounting and charging system 100 can be configured to mount/hold and wirelessly charge multiple portable electronic devices 12 at once onto a single wireless charging device 10. For example, the wireless charging device 10 can include an induction charging surface 16 with dimensions large enough to hold two smart phones, or a smart phone and tablet.

It will be understood by one of ordinary skill in the art that the systems and methods described herein may be adapted and modified as appropriate for the application being addressed or may be employed in other suitable applications, and that such adaptions and modifications are for purposes of illustrating one or more exemplary embodiments and not for purposes of limiting same. It will also be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for mounting and charging a portable electronic device comprising:
   a control unit receiving a command to begin operating a wireless charging device;
   operating a suction pump in response to receiving the command to begin operating such that air is drawn through a suctioning unit positioned on or adjacent to an induction charging surface of the wireless charging device to provide a suction force to draw the portable electronic device on or in contiguity to the induction charging surface and maintain the suction force to mount the portable electronic device on or in contiguity to the induction charging surface;
   operating an induction coil on or adjacent to the induction charging surface to transfer energy from the wireless charging device to the portable electronic device while the portable electronic device is mounted on or in contiguity to the induction charging surface; and
   providing power to the suction pump and the induction coil,
      wherein providing power to the suction pump and the induction coil includes least one of: providing an amount of power to provide the suction force to draw the portable electronic device, providing the amount of power required to maintain the suction force to mount the portable electronic device, and providing the amount of power to transfer energy from the wireless charging device to the portable electronic device.

2. The method of claim 1, further comprising sensing the portable electronic device to be in close proximity to the induction charging surface using a proximity sensor.

3. The method of claim 2, wherein the command to begin operating the wireless charging device is provided based on the proximity sensor sensing the portable electronic device.

4. The method of claim 3, wherein the proximity sensor continuously monitors for the presence of the portable electronic device while the suction pump is operating.

5. The method of claim 1, wherein operating a suction pump further includes providing the suction force acting to mount and resist movement of the portable electronic device with respect to the wireless charging device in a vertical or semi vertical direction.

6. The method of claim 5, further comprising determining the amount of power required to maintain the suction force, and where the amount of power is not greater than a predetermined threshold continuing to provide the amount of power required to maintain the suction vacuum to mount and resist movement of the portable electronic device.

7. The method of claim 6, where the amount of power required to maintain the suction force is greater than the predetermined threshold stopping the suction pump.

8. The method of claim 1, further comprising stopping the suction pump based on not sensing the portable electronic device in close proximity to the induction charging surface.

9. The method of claim 1, further comprising stopping the suction pump based on sensing a presence of an object other than the portable electronic device.

10. An electronic device mounting and charging system for wirelessly charging a portable electronic device in a vertical, semi-vertical, or horizontal position comprising:
    a wireless charging device casing;
    an induction charging surface on or in the casing;
    an induction coil on or adjacent to the induction charging surface;
    a plurality of suctioning units on or adjacent to the induction charging surface;
    a suction pump that is included within the casing, wherein the suction pump is in fluid communication with the plurality of suctioning units; and
    a control unit in communication with the induction coil and suction pump that provides power to the induction coil and the suction pump,
       wherein the control unit providing power includes at least one of: providing an amount of power to provide a suction force to draw the portable electronic device on or in contiguity to the induction charging surface, providing the amount of power required to maintain the suction force to mount the portable electronic device on or in contiguity to the induction charging surface, and providing the amount of power to transfer energy from the wireless charging device to the portable electronic device while the portable electronic device is mounted on or in contiguity to the induction charging surface.

11. The system of claim 10, further comprising a plurality of proximity sensors located on or adjacent to the induction charging surface, each proximity sensor being configured to sense a presence of an object in close proximity to the induction charging surface, wherein the plurality of proximity sensors are in electrical communication with the control unit.

12. The system of claim 11, wherein the control unit turns on the suction pump based on at least one of the following: the plurality of proximity sensors sensing a presence of a portable electronic device in close proximity to the induction charging surface of the wireless charging device, a manual power switch electrically connected with the control unit being in an ON position, or the control unit receiving power from an external power source.

13. The system of claim 12, wherein the suction pump is configured to provide an amount of suction to provide a suction force acting to mount and resist movement of the portable electronic device in a vertical or semi-vertical position until the control unit determines that power required to maintain a suction vacuum force is greater than a predetermined threshold.

14. The system of claim 10, wherein the induction charging surface is configured to inductively charge a plurality of classes of portable electronic devices, and the wireless charging device includes one or more visual qualities to inform a user that a portable electronic device is being charged.

15. The system of claim 10, wherein the wireless charging device casing includes a power adapter that receives power from an external power source.

16. The system of claim 10, wherein a rear surface of the wireless charging device casing includes an attachment member that attaches to a plurality of external surfaces.

17. The system of claim 10, wherein the suction pump is located in the wireless charging device casing.

18. A method for simultaneously mounting and wirelessly charging a portable electronic device in a vertical, semi-vertical, or horizontal position comprising:
   providing a wireless charging device including an induction charging surface that is associated with an induction coil;
   creating a suctioning vacuum by drawing air through air intake holes of a plurality of suctioning units through a vacuum air duct into a suction pump to create a suction vacuum between the plurality of suctioning units and the surface of the portable electronic device to draw and mount the portable electronic device on or in contiguity to the induction charging surface;
   providing a wireless electrical charge from the induction coil to transfer a wireless electric charge through an electromagnetic field from the induction coil to a receiver coil within the portable electronic device; and
   providing power to the induction coil and the suction pump,
      wherein providing power includes at least one of: providing an amount of power to create the suction vacuum to draw the portable electronic device on or in contiguity to the induction charging surface, providing the amount of power required to maintain the suction vacuum to mount the portable electronic device on or in contiguity to the induction charging surface, and providing the amount of power to transfer energy from the wireless charging device to the portable electronic device while the portable electronic device is mounted on or in contiguity to the induction charging surface.

19. The method of claim 18, further comprising determining that a power required to maintain the suction vacuum is not greater than a predetermined threshold and air is drawn through the air intake holes of the plurality of suctioning units to the suction pump to create the suction vacuum based on at least one of the following: a plurality of proximity sensors sensing a portable electronic device in close proximity to the induction charging surface, a manual push button is in the ON position, or the wireless charging device is receiving power from a power source.

20. The method of claim 19, further comprising determining that the power required to maintain the suction vacuum is greater than a predetermined threshold and stopping the drawing of air through the air intake holes of the plurality of suctioning units to the suction pump, wherein the suction vacuum discontinues and no longer mounts and resists movement of the portable electronic device in a vertical or semi vertical position.

* * * * *